No. 642,663. Patented Feb. 6, 1900.
C. G. ARMSTRONG & W. D. NEEL.
MEANS FOR GENERATING OZONE.
(Application filed Mar. 12, 1898.)
(No Model.)
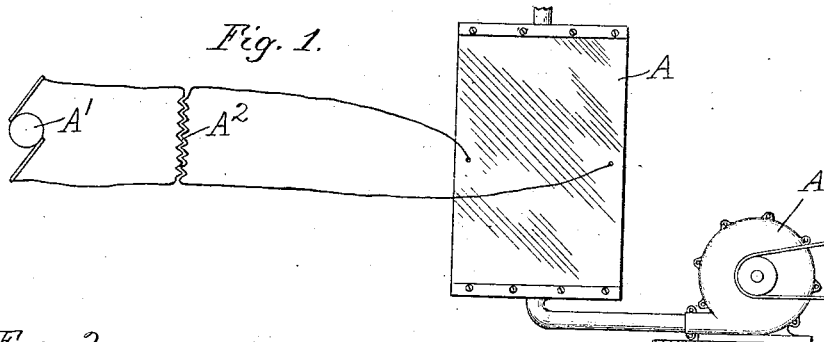
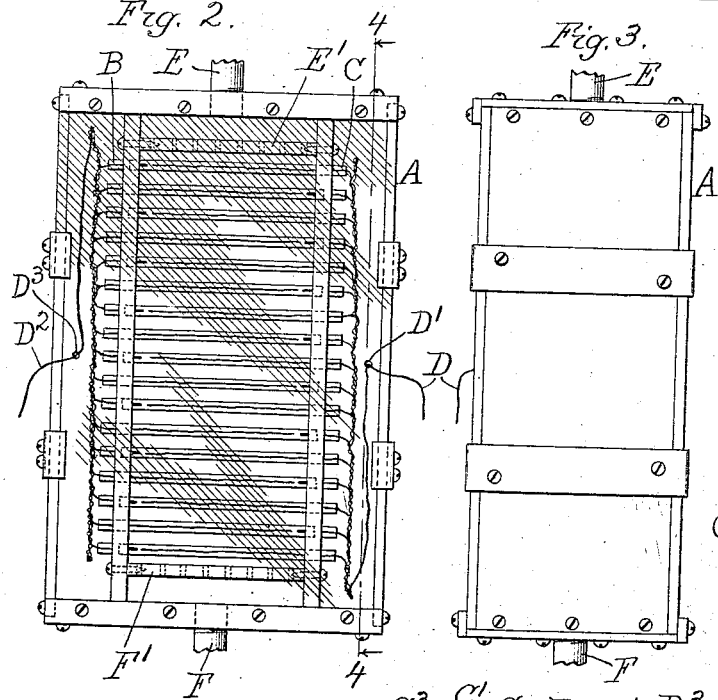
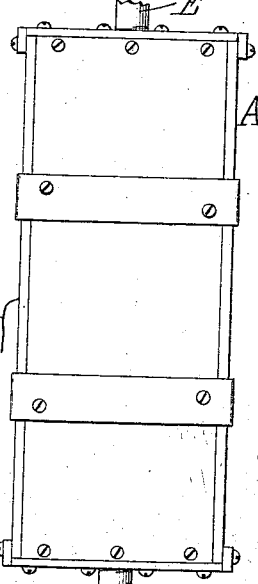
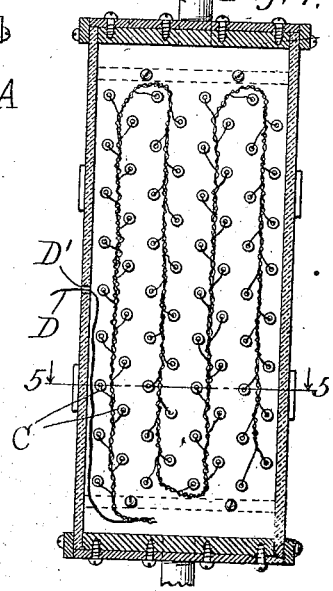
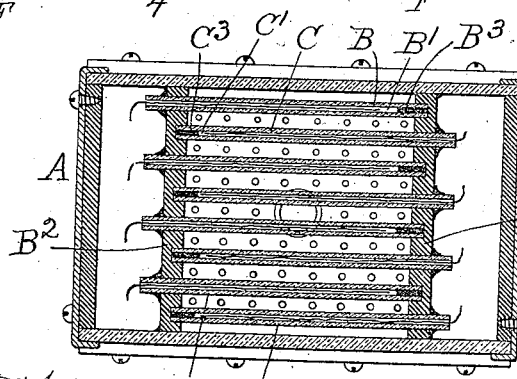
Witnesses,
Edward T. Wray
Harry B. C. White
Charles G. Armstrong
William D. Neel
Inventors.

UNITED STATES PATENT OFFICE.

CHARLES G. ARMSTRONG AND WILLIAM D. NEEL, OF CHICAGO, ILLINOIS.

MEANS FOR GENERATING OZONE.

SPECIFICATION forming part of Letters Patent No. 642,663, dated February 6, 1900.

Application filed March 12, 1898. Serial No. 673,609. (No model.)

*To all whom it may concern:*

Be it known that we, CHARLES G. ARMSTRONG and WILLIAM D. NEEL, citizens of the United States, residing at Chicago, in the county of Cook and State of Illinois, have invented a certain new and useful Improvement in Means for Generating Ozone, of which the following is a specification.

Our invention relates to means for generating what is commonly known as "ozone," and has for its object to provide a new and improved apparatus for this purpose.

Our invention is illustrated in the accompanying drawings, wherein—

Figure 1 is a diagrammatic view illustrating our invention. Fig. 2 is a view of the generator as seen from beneath. Fig. 3 is a side view of the generator. Fig. 4 is a section on line 4 4, Fig. 2. Fig. 5 is a section on line 5 5, Fig. 4.

Like letters refer to like parts throughout the several figures.

The antiseptic commonly known as "ozone" has heretofore been made in small quantities by means of electrical discharges.

The object of our present invention is to provide means for generating ozone in commercial quantities at a comparatively small cost.

Referring to the accompanying drawings, we have illustrated in Fig. 1 an ozone-generator A, associated with a source of electrical supply A', a suitable transforming device $A^2$ being interposed between the generator and the source of electrical supply for raising the current to the desired voltage. It is of course evident that any suitable source of electrical supply may be utilized and that any current of a sufficiently high voltage may be passed through the generator, the connection of the generator to the source of electrical supply depending of course upon the conditions and material at hand. Associated with the generator A is a suitable device $A^3$, by means of which the oxygen or air is passed through the generator. It is of course evident that any suitable arrangement for this purpose may be utilized.

Referring now to Figs. 2 to 5, inclusive, the generator A is made up of a series of electrodes or conductors B C, one set of electrodes — B, for example — being connected with one branch of the electric circuit, the other set, C, being connected with the other branch of the circuit, thus making the electrodes B of opposite polarity to the electrodes C. Said electrodes may be made of any suitable conducting material and, as herein illustrated, consist of copper wires which project from the ends of the tubes and which are wrapped one about the other, so that they will all be electrically connected together. This method of forming the electrodes is cheap, durable, and efficient. In the operation of our device we prefer to use an alternating current of comparatively high voltage, the voltage depending of course upon the construction of the generator and the conditions to be met. The electrodes B and C are composed of conducting material and preferably have a comparatively small cross-section or surface area. This result may be obtained by forming the electrodes into wires or the like. These conductors or electrodes are surrounded by some suitable non-conducting material B' C'. It is of course evident that any suitable material for this purpose may be used and that such material may be formed and disposed in any suitable manner. For purposes of illustration we have shown this non-conducting material B' C' as consisting of comparatively small tubes of glass or other material, into which the electrodes are inserted. These tubes are provided with a suitable support, by means of which they are supported in proximity to each other, the several tubes being separated by suitable air-spaces. The several conductors are also insulated from each other in some suitable manner, so as to prevent the destructive discharge of the current from the positive to the negative electrodes. As illustrated in the drawings, we have supported the electrodes upon the supports $B^2 C^2$. These supports are made of insulating material, and the support $B^2$ is provided with holes, through which pass the tubes B' containing the electrodes B. The support $C^2$ is provided with a series of holes or indentations which extend only partially through the support and which receive the ends of the tubes B'. We prefer to provide the openings in the ends of the tubes B' C' with some suitable insulating material $B^3 C^3$, the electrodes preferably of such length that their ends are in proximity to this insulating material. By providing the supports $B^2$ and $C^2$ with openings which extend only part way therethrough to receive the ends of the tubes, as shown in Fig. 5, we securely insulate one set of electrodes from the other, and by filling the tubes part way with insulating material, such as sealing-wax, as illustrated in said figure, we secure a better insulated construction and also prevent the destructive action of the ozone on the active wires in the tubes. It is of course evident that this construction may be varied in any suitable manner and that the insulation of the several parts may be brought about by any suitable means. The electrodes are preferably arranged so that they will be alternating positive and negative and are preferably so positioned as to be a uniform distance apart throughout their length, so as to prevent any evil effect—such, for example, as a spark-discharge, which might be brought about by having some portions of the electrodes closer to each other than other portions. It will be seen that by this construction the electrodes are completely surrounded by insulating material and in addition are insulated by air-spaces between the surrounding pieces of insulating material. The electrodes C and B are connected in circuit in any suitable manner. As shown in the drawings, the electrodes C, for example, are connected together, as indicated in Fig. 4, and are all connected to a conductor D, which passes through an opening $D'$ in the casing which surrounds the electrodes. The electrodes B are connected together in a similar manner and are connected to the conductor $D^2$, which passes through an opening $D^3$ in the inclosing box or casing. Any suitable inclosing device may be used, and such inclosing device is preferably made of non-insulating material, preferably hard rubber. The supports $B^3$ and $C^3$ divide the interior of the casing into three apartments. The ozone is formed in the central apartment, and the two outer apartments are entirely separated from the said central apartment and contain the connecting-wires for the electrodes. By this arrangement the connecting-wires are entirely free from ozone, and thus the destructive action of the ozone on the wires entirely obviated. This casing or box is provided with a suitable inlet and outlet E and F, by means of which oxygen or air may be passed into the generator and the ozone removed therefrom. It will be noted that by this construction the electrodes are broken up, as it were, into comparatively small elements, the elements being supported upon a suitable support in proximity to each other. Opposed to the inlet and outlet we prefer to provide a suitable distributing device—as, for example, the plates $E'$ $F'$, said plates being provided with a series of openings adapted to scatter or distribute the oxygen or air, so that substantially the entire length of the electrodes may be utilized.

In using our device for making ozone we connect the electrodes B and C with a suitable source of electric supply, a comparatively high-voltage alternating current being preferably used. When the electrodes are connected in circuit, a silent or brush discharge, as it were, occurs between the electrodes of opposite polarity, the voltage of the current being regulated so as to produce this result. This brush-discharge causes the air between the electrodes to assume a bluish tinge, as it were, and is distinguished from the illumination or spark which occurs when a spark-discharge takes place. Air or oxygen, either alone or mixed with other gases, is passed through the generator, and by means of this silent or brush discharge we produce what is commonly termed "ozone."

We have found that by means of this construction the ordinary atmosphere or air may be passed at a comparatively rapid rate through the generator, a portion of the air being quickly converted into ozone. It will therefore be seen that we have here a cheap, efficient, and commercially successful device for converting oxygen into ozone in commercial quantities. Any suitable device for moving the oxygen or air or the like through the generator may be used—such, for example, as a pump or fan—and we have found that when air is passed through our generator it is converted into ozone of a comparatively pure quality unmixed with undesirable gases.

Our generator may be used for any desired purpose. For example, it may be used to generate ozone for antiseptic purposes or for commercial use in any of the fields where the use of ozone or an antiseptic or sterilizing agent may be beneficial.

We have described in detail a particular construction of our device for purposes of illustration, but we wish it to be understood that we in no manner limit ourselves to the construction shown, as the device may be varied in form, construction, and arrangement without departing from the spirit of our invention. The number of electrodes and their arrangement and distance apart may, of course, be varied in accordance with the conditions to be met.

By providing two chambers for the connecting-wires, which are separated from the chamber in which the ozone is generated and also from the chamber into which the ozone is discharged, it will be seen that the connecting-wires are entirely protected from the deteriorating effect of the ozone. As the insulation of these connecting-wires is injured or removed at the points of connection it will be seen that some suitable protection is necessary.

We claim—

1. A device for forming what is commonly termed "ozone," comprising a series of electrodes adapted to be connected with a source of electric supply, each electrode surrounded by an insulating-tube, two supports in proximity to each other, between which said insulating-tubes extend and upon which they are supported, a box or casing inclosing said electrodes and tubes, the supports for the tubes engaging the inner walls of the box on the four sides thereof, so that there is a complete engagement around the entire outer edges of the supports so as to divide the box into three apartments, a central apartment containing the tubes and two outer apartments containing the connecting-wires leading thereto, an inlet and outlet for said casing or box opposite the central apartment, and a distributing-plate adapted to distribute the air equally over the total area of said tubes.

2. A device for forming what is commonly termed "ozone," comprising a series of electrodes contained within a suitable casing and adapted to be connected with sources of electric supply, an insulating-tube surrounding each of said electrodes, said insulating-tubes supported in proximity to one another, so as to be separated by air-spaces, supports for said tubes dividing said casing into three apartments, the two outer apartments containing the connecting-wires leading to the electrodes, the central apartment containing the electrodes and forming the ozone-chamber, an inlet and an outlet for said central apartment, and a distributing-plate attached to said supports and extending across said central chamber and adapted to distribute the entering material equally over the total area of said tubes.

3. A device for forming what is commonly termed "ozone," comprising a series of electrodes contained in a suitable casing, and adapted to be connected with sources of electric supply, an insulating-tube surrounding each of said electrodes, said insulating-tubes supported in proximity to one another so as to be separated by air-spaces, the supports for said tubes dividing the casing into three apartments, the two outer apartments containing the connecting-wires for the electrodes and the central apartment containing the electrodes used in generating the ozone, said electrodes and tubes divided into two sets of opposite polarity, one set of tubes passing entirely through one of said supports and extending only part way through the other support, the ends of said tubes being partly filled with some insulating material, so as to prevent the ozone from injuring the electrodes contained therein.

4. A device for forming what is commonly termed "ozone," comprising a series of electrodes contained in a suitable casing, and adapted to be connected with a source of electric supply, said electrodes provided with surrounding insulated tubes, two insulating-supports for said tubes and electrodes, said supports dividing the casing into three apartments, the electrodes and tubes being divided into two sets of opposite polarity, a series of connecting-wires for one set of electrodes contained within one of said apartments and a series of connecting-wires for the other set of electrodes contained in another of said apartments, the two apartments containing connecting-wires being separated from the central or ozone apartment, so as to prevent the destructive action of the ozone on said wires, the ends of the tubes of one set of electrodes extending only part way through the support farthest from the connecting-wires leading to said electrodes, so as to entirely separate the two sets of electrodes, the ends of said tubes being partially filled with insulating material, so as to prevent the destructive action of the ozone on the electrodes, an inlet and an outlet for said central ozone apartment, and a perforated plate extending across said apartment in proximity to said inlet and adapted to distribute the air equally over the total area of said tubes and electrodes, substantially as described.

5. A device for forming what is commonly termed "ozone," comprising a series of glass tubes inclosed within a casing, two supports extending across said casing so as to divide it into three apartments, two outer apartments and a central apartment, the tubes being supported thereby and contained in the central apartment, a series of wires contained within said tubes and extending out of the ends, the ends of the tubes being filled with insulating material, said wires being connected together within the outer apartments formed by said supports, so as to be electrically connected, an inlet and an outlet communicating with said central apartment, a distributing-plate connected with said supports and located between the inlet and said tubes, so as to distribute the air evenly over them, substantially as described.

CHARLES G. ARMSTRONG.
WILLIAM D. NEEL.

Witnesses:
WILLIAM L. FERGUS,
DONALD M. CARTER.